(12) United States Patent
Aoki et al.

(10) Patent No.: US 6,821,228 B2
(45) Date of Patent: Nov. 23, 2004

(54) CONTROL APPARATUS FOR CONTINUOUSLY VARIABLE TRANSMISSION

(75) Inventors: Akihira Aoki, Saitama-ken (JP); Shuichi Fujimoto, Saitama-ken (JP); Hisashi Kunii, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/445,191

(22) Filed: May 27, 2003

(65) Prior Publication Data

US 2003/0228953 A1 Dec. 11, 2003

(30) Foreign Application Priority Data

Jun. 5, 2002 (JP) ........................................ 2002-164889

(51) Int. Cl.$^7$ ............................................... B60K 41/12
(52) U.S. Cl. .............................. 477/44; 477/41; 701/52
(58) Field of Search ............................. 477/37, 41, 44, 477/46; 701/52

(56) References Cited

U.S. PATENT DOCUMENTS

| | | | | |
|---|---|---|---|---|
| 5,947,861 A | * | 9/1999 | Nobumoto | .................... 477/37 |
| 6,035,735 A | * | 3/2000 | Graf et al. | ................. 74/336 R |
| 6,244,986 B1 | * | 6/2001 | Mori et al. | .................... 477/46 |
| 6,602,163 B2 | * | 8/2003 | Tamura et al. | ................. 477/37 |

* cited by examiner

Primary Examiner—Tisha Lewis
(74) Attorney, Agent, or Firm—Arent Fox PLLC (57) ABSTRACT

A control apparatus for a continuously variable transmission for use with a vehicle is provided for permitting a driver to select one from three transmission modes for the continuously variable transmission, and providing an appropriate transmission ratio in accordance with a particular operating condition of a vehicle without causing an insufficient engine torque or over-revolution, particularly when the transmission is switched from a continuously variable transmission mode to a stepped manual transmission mode. The control apparatus comprises an ECU and an MT switch. The ECU executes a continuous automatic transmission mode for continuously setting a transmission ratio of the continuously variable transmission in accordance with a detected operating condition of the vehicle. The ECU also executes a stepped automatic transmission mode for setting the transmission ratio of the continuously variable transmission to one of a plurality of predetermined transmission stages in accordance with the detected operating condition of the vehicle. The CPU further executes a stepped manual transmission mode for setting the transmission ratio to one of a plurality of predetermined transmission stages in accordance with a driver's intention of transmission. The ECU sets the continuously variable transmission to one of the continuous automatic transmission mode, the stepped automatic transmission mode and the stepped manual transmission mode in accordance with a manipulating state of an MT switch.

3 Claims, 11 Drawing Sheets

FIG. 12

CONTROL APPARATUS FOR CONTINUOUSLY VARIABLE TRANSMISSION

BACKGROUND OF THE INVENTION

1. Field of the Invention

The present invention relates to a control apparatus for continuously variable transmission for use with a vehicle which can continuously vary the output of an internal combustion engine.

2. Description of the Prior Art

A conventional control apparatus for a continuously variable transmission of the type mentioned above is known, for example, from Japanese Patent No. 3,218,962. This continuously variable transmission is applied to an internal combustion engine equipped in a vehicle. The control apparatus provides an automatic transmission mode and a manual mode for the continuously variable transmission. In the automatic transmission mode, the transmission is controlled to continuously change the transmission ratio thereof to a target transmission ratio which is continuously set in accordance with a vehicle speed and the like. In the manual mode, on the other hand, one of a plurality of transmission stages is selected in accordance with an operation performed by a driver on a shift lever, and a target transmission ratio is set to a predetermined transmission ratio corresponding to the selected transmission ratio. The transmission ratio of the continuously variable transmission is controlled to reach the target transmission ratio which is set as mentioned. These two transmission modes are switched from one to the other during an operation of the engine by an operation performed by the driver on the shift lever. Particularly, a switching operation from the automatic transmission mode to the manual mode is performed in the following manner. First, an actual transmission ratio at the time of the switching is compared with a target transmission ratio of each transmission stage. A transmission stage immediately after the switching is shifted to the High-side transmission stage closest to the transmission ratio in a first implementation, and to the closest Low-side transmission stage in a second implementation. The latter case is equivalent to shifting down the transmission stage, which can be utilized as a brake. In the former case, each time the driver operates the shift lever to the High side or to the Low side, the transmission is shifted up or down by one stage.

According to the conventional control apparatus for a continuously variable transmission described above, after the automatic transmission mode is switched to the manual mode, the transmission is fixed at a preset High-side or Low-side predetermined transmission stage, i.e., a constant transmission ratio irrespective of a particular operating condition of the engine until the driver operates the shift lever. For this reason, if the driver performs the aforementioned switching and shifts the transmission to the High side in a situation where the vehicle is climbing up a slope and therefore requires a high engine torque, the engine torque can be insufficient. Also, if the aforementioned switching is caused by an erroneous operation, the driver is often unaware that the continuously variable transmission has been switched to the manual mode because the transmission ratio of the continuously variable transmission is fixed at a constant transmission ratio. Therefore, for example, if the driver keeps treading down the accelerator pedal for acceleration without being aware that the transmission has been shifted to the Low side upon switching, the engine would be burdened with possible over-revolution.

OBJECT AND SUMMARY OF THE INVENTION

The present invention has been made to solve the problem mentioned above, and it is an object of the invention to provide a control apparatus for a continuously variable transmission which is capable of permitting a driver to select one from three transmission modes for the continuously variable transmission, and providing an appropriate transmission ratio in accordance with a particular operating condition of a vehicle without causing an insufficient engine torque or over-revolution, particularly when the transmission is switched from a continuously variable transmission mode to a stepped manual transmission mode.

To achieve the above object, the present invention provides a control apparatus for a continuously variable transmission for use with a vehicle, capable of continuously varying the output of an internal combustion engine. The control apparatus is characterized by comprising operating condition detecting means for detecting an operating condition of the vehicle; continuous automatic transmission mode executing means for executing a continuous automatic transmission mode for continuously setting a transmission ratio of the continuously variable transmission in accordance with the detected operating condition of the vehicle as a transmission mode for the continuously variable transmission; stepped automatic transmission mode executing means for executing a stepped automatic transmission mode for setting the transmission ratio of the continuously variable transmission to one of a plurality of predetermined transmission stages in accordance with the detected operating condition of the vehicle as the transmission mode for the continuously variable transmission; stepped manual transmission mode executing means for executing a stepped manual transmission mode for setting the transmission ratio to one of a plurality of predetermined transmission stages in accordance with a driver's intention of transmission as the transmission mode for the continuously variable transmission; switch operating means manipulated for switching the transmission mode of the continuously variable transmission; and transmission mode setting means for setting the continuously variable transmission to one of the continuous automatic transmission mode, the stepped automatic transmission mode and the stepped manual transmission mode in accordance with a manipulating state of the switch operating means.

According to this control apparatus for a continuously variable transmission for use with a vehicle, the stepped automatic transmission mode is provided as a transmission mode for the continuously variable transmission in addition to the continuous automatic transmission and stepped manual transmission. The continuously variable transmission is set to one of the three transmission modes in accordance with a manipulating state of the switch operating means. When the continuously variable transmission is set to the stepped manual transmission mode, the transmission ratio can be provided step by step in accordance with the driver's intention of transmission. Also, when the continuously variable transmission is set to the continuous automatic transmission mode or stepped automatic transmission mode, an appropriate transmission ratio can be provided in a continuous manner or step by step in accordance with a particular operating condition of the vehicle.

Preferably, in the control apparatus for a continuously variable transmission for use with a vehicle described above, the transmission mode setting means temporarily sets the continuously variable transmission to the stepped automatic transmission mode when the switch operating means is manipulated to switch from the continuous automatic transmission mode to the stepped manual transmission mode.

According to this preferred embodiment of the control apparatus, when the switch operating means is manipulated to switch the continuously variable transmission from the continuous automatic transmission mode to the stepped manual transmission mode, the continuously variable transmission is not immediately switched from the continuously variable transmission mode to the stepped manual transmission mode, but is temporarily set to the stepped automatic transmission mode. As a result, the continuously variable transmission is not fixed at a constant transmission ratio, but is set to an appropriate transmission stage at all times in accordance with a particular operating condition of the vehicle, thereby making it possible to ensure a proper engine torque when the continuously variable transmission is switched from the continuous automatic transmission mode to the stepped manual transmission mode. Also, in the present invention, even when the driver erroneously operates the switch operating means to switch the continuously variable transmission, for example, from the continuous automatic transmission mode to the stepped manual transmission mode, the continuously variable transmission is temporarily set to the stepped automatic transmission mode, so that the transmission ratio is changed step by step in accordance with a particular operating condition of the vehicle. In this way, the driver can feel the change in the transmission mode, thereby preventing over-revolution and the like.

Preferably, the control apparatus for a continuously variable transmission for use with a vehicle further comprises transmission stage changing means manipulated for changing the continuously variable transmission from one transmission stage to another, wherein the transmission mode setting means sets the continuously variable transmission to the stepped manual transmission mode when the transmission stage changing means is manipulated after the continuously variable transmission has been temporarily set in the stepped automatic transmission mode.

According to this preferred embodiment of the control apparatus, when the transmission stage changing means is manipulated after the continuously variable transmission has been temporarily set in the stepped automatic transmission mode, the continuously variable transmission is switched to the stepped manual transmission mode. Thus, the continuously variable transmission is switched to the stepped manual transmission mode after confirming the driver's intention of transmission whether he really wishes to change the transmission stage, so that the continuously variable transmission can be appropriately switched to the stepped manual transmission mode while avoiding a switching which would be otherwise made due to an erroneous manipulation on the switch operating means.

DETAILED DESCRIPTION OF THE EMBODIMENT

Figure 1:
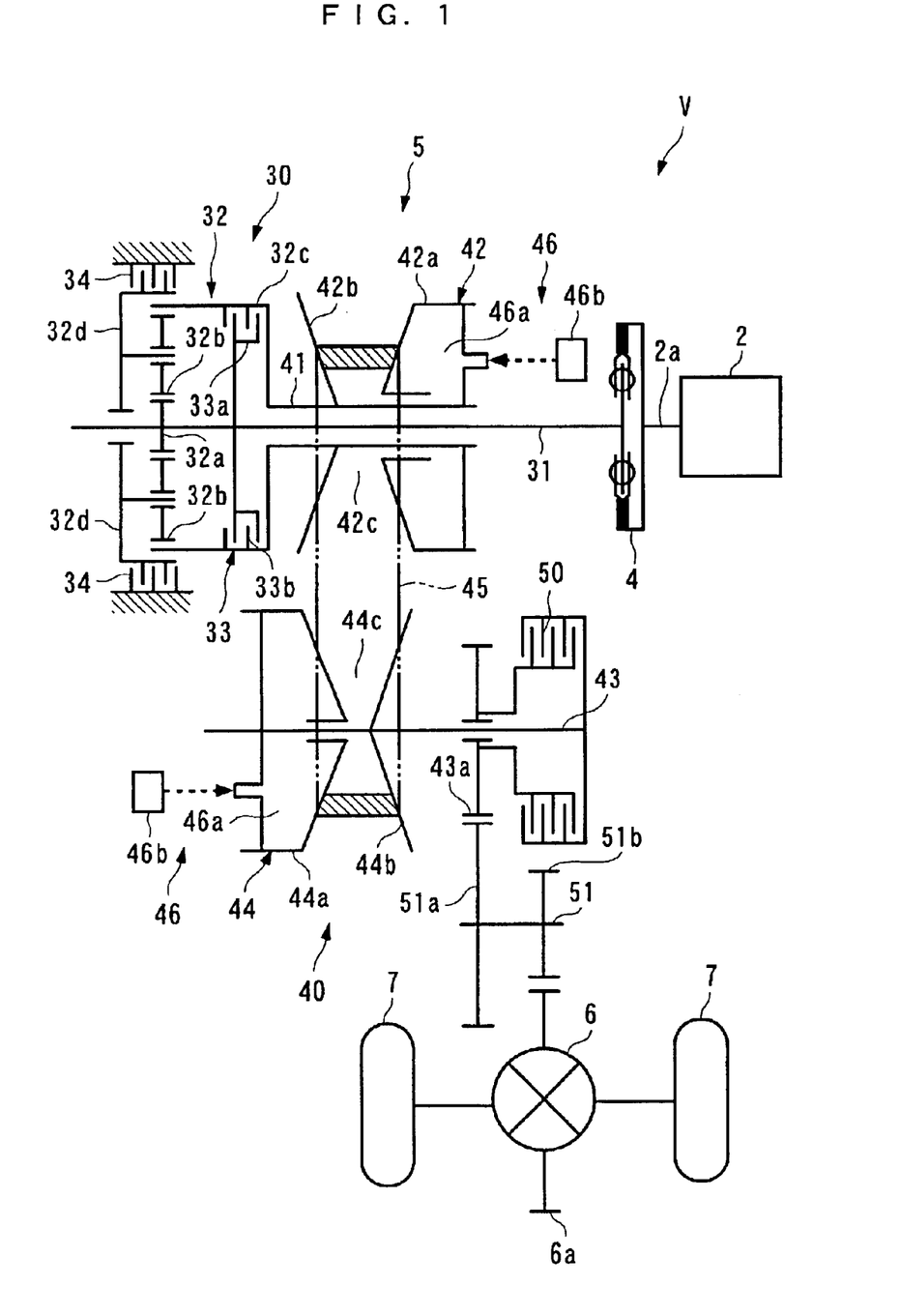
FIG. 1 is a schematic diagram illustrating the structure of a vehicle driving system.
Figure 2:
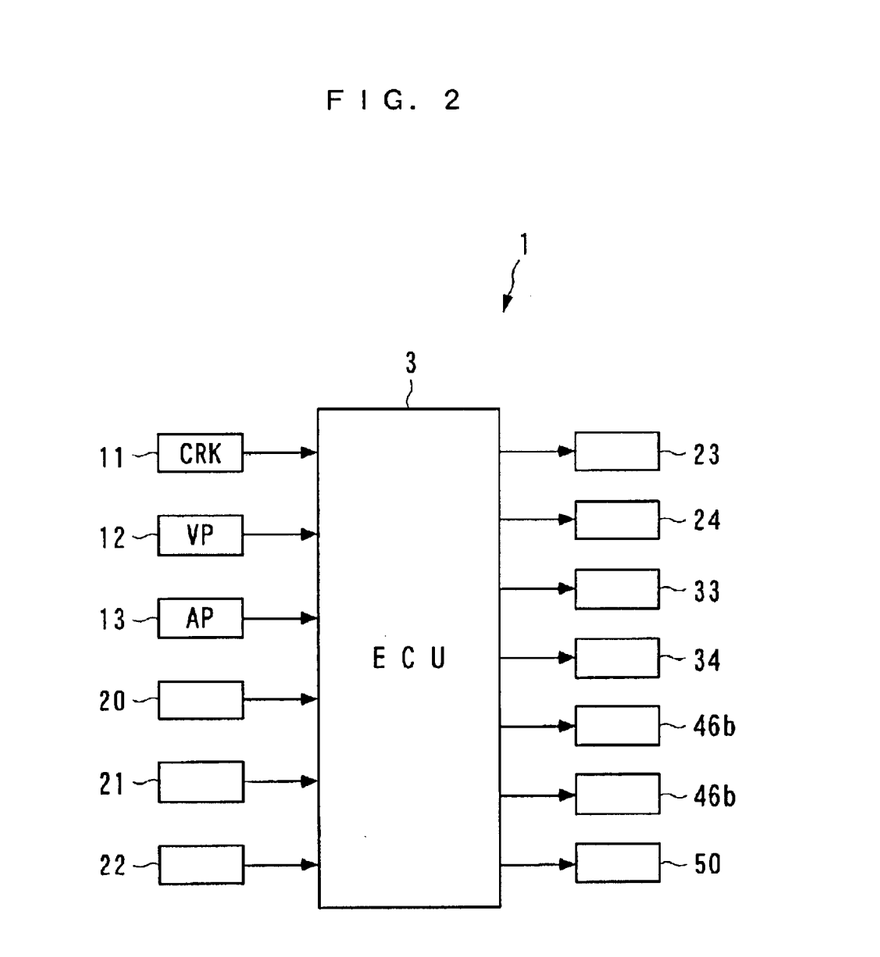
FIG. 2 is a block diagram generally illustrating a control apparatus for a continuously variable transmission according to the present invention.

In the following, a preferred embodiment of the present invention will be described in detail with reference to the accompanying drawings. FIGS. 1 and 2 generally illustrate the configuration of a vehicle driving system to which a control apparatus 1 for a continuously variable transmission for use with a vehicle is applied according to the present invention. The control apparatus 1 controls a transmission ratio of a continuously variable transmission 40, and the like, as later described.

An internal combustion engine (hereinafter called the "engine") 2 is a gasoline engine equipped in a vehicle V. The engine 2 is coupled to driven wheels 7 through a fly wheel damper 4, an automatic transmission 5, a differential gear mechanism 6 and the like, so that a torque of the engine 2 is transmitted to the driven wheels 7 through these components 4–6.

The fly wheel damper 4 is coupled to a crank shaft 2a of the engine 2 for transmitting a torque of the engine 2 to the automatic transmission 5 while reducing fluctuations in the torque and attenuating torsional vibrations.

The automatic transmission 5 is comprised of a forward/backward switching mechanism 30, a continuously variable transmission 40, a starting clutch 50, and the like. The forward/backward switching mechanism 30 comprises an input shaft 31, and a planetary gear device 32 attached to the input shaft 31. The input shaft 31 has one end coupled to the fly wheel damper 4, and rotatably extends through a hollow main shaft 41. The planetary gear device 32 is comprised of a sun gear 32a, a carrier 32d for rotatably supporting a plurality of (for example, four) pinion gears in mesh with the sun gear 32a, a ring gear 32c in mesh with each pinion gear 32b, and the like.

The sun gear 32a is integral with the input shaft 31, and a portion of the input shaft 31 closer to the engine 2 than the sun gear 32a is coupled to a clutch inner 33a of a forward clutch 33 which has a clutch outer 33b coupled to the ring gear 32c and main shaft 41. Connection and disconnection of the forward clutch 33 is controlled by an ECU 3, later described. A reverse brake 34 is also coupled to the carrier 32d. The action of the reverse brake 34 is also controlled by the ECU 3.

In the foregoing configuration, when the vehicle V is running forward, the reverse brake 34 is released and the forward clutch 33 is connected in the forward/backward switching mechanism 30, so that the input shaft 31 is directly connected to the main shaft 41, causing the rotation of the input shaft 31 to be directly transmitted to the main shaft 41. Each pinion gear 32b does not rotate about its axis, and the carrier 32d, integral with the input shaft 31, idles in the same direction. During forward running of the vehicle V, the main shaft 41 is rotated in the same direction as the input shaft 31 at the same rotational speed. On the other hand, during backward running of the vehicle V, the forward clutch 33 is disconnected, and the reverse brake 34 is engaged to lock the carrier 32d, contrary to the foregoing. Consequently, the rotation of the input shaft 31 is transmitted to the ring gear 32c through the sun gear 32a and pinion gears 32b, causing the ring gear 32c and main shaft 41 connected thereto to rotate in the direction opposite to the input shaft 31. In this way, during backward running of the vehicle V, the main shaft 41 rotates in the direction opposite to the input shaft 31.

The continuously variable transmission 40, which is of a belt type, is comprised of the main shaft 41, a driving pulley 42, a counter shaft 43, a driven pulley 44, and the like.

The driving pulley 42 has a frusto-conical movable pulley half 42a and stationary pulley half 42b. The movable pulley half 42a is axially movably and unrotatably attached on the main shaft 41, while the stationary pulley half 42b is fixed to the main shaft 41 and opposes the movable pulley half 42a. Faces of the movable pulley half 42a and stationary pulley half 42b opposing each other are inclined, such that a V-shaped belt groove 42c is formed by the movable pulley half 42a, stationary pulley half 42b and main shaft 41.

The driven pulley 44, which is similar in structure to the driving pulley 42, has a frusto-conical movable pulley half 44a and stationary pulley half 44b. The movable pulley half 44a is axially movably and unrotatably attached on the counter shaft 43, while the stationary pulley half 44b is fixed to the counter shaft 43 and opposes the movable pulley half 44a. Faces of the movable pulley half 44a and stationary pulley half 44b opposing each other are inclined, such that a V-shaped belt groove 44c is formed by the movable pulley half 44a, stationary pulley half 44b and counter shaft 43.

A metal belt 45 is wound around the belt grooves 42c, 44c of both pulleys 42, 44. Each of the movable pulley halves 42a, 44a is provided with a pulley width varying mechanism 46 for moving the movable pulley half 42a or 44a in the axial direction. Each pulley width varying mechanism 46 is comprised of an oil chamber 46a disposed on the back side of the movable pulley half 42a, 44a, an oil pressure control valve 46 for controlling an oil pressure supplied to the oil chamber 46a, and the like. The opening of the oil pressure control valve 46b is controlled by the ECU 3.

In the continuously variable transmission 40 configured as described above, the oil pressure control valve 46b is controlled by the ECU 3 to control the oil pressure in the oil chamber 46a, so that the movable pulley halves 42a, 44a are positioned in accordance with the controlled oil pressure. In this way, the distances between the movable pulley halves 42a, 44a and stationary pulley halves 42b, 44b, i.e., the widths of the belt grooves 42c, 44c can be variably set independently of each other to continuously change a rotational speed ratio between the main shaft 41 and counter shaft 43, thereby continuously controlling the transmission ratio of the continuously variable transmission 40.

As described later, the continuously variable transmission 40 is set to one of the following three transmission modes by the control apparatus 1:
1. a continuous automatic transmission mode (hereinafter called the "CVT mode") for continuously setting the transmission ratio in accordance with a particular operating condition of the vehicle V;
2. a stepped automatic transmission mode (hereinafter called the "AT mode") for setting the continuously variable transmission 40 to one of a plurality of predetermined transmission ratios in accordance with a particular operating condition of the vehicle V; and
3. a stepped manual transmission mode (hereinafter called the "MT mode") for setting the continuously variable transmission 40 to one of a plurality of predetermined transmission ratios in accordance with the driver's intention of transmission.

The starting clutch 50 is provided for connecting and disconnecting the gear 43a rotatably disposed on the counter shaft 43 to and from the counter shaft 43, and its operation is controlled by the ECU 3. The gear 43a is in mesh with a gear 6a of the differential gear mechanism 6 through a larger idler gear 51a and a smaller idler gear 51b disposed on an idler shaft 51. With the foregoing configuration, as the starting clutch 50 is connected, the rotation of the counter shaft 43 is transmitted to the driven wheels 7 through these gears 43a, 51a, 51b and 6a, thereby permitting the vehicle V to start.

Figure 3:
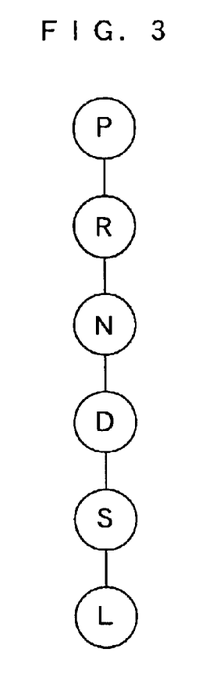
FIG. 3 is a diagram illustrating a shift range and shift positions of a shift lever.

FIG. 3 illustrates a shift range and shift positions of a shift lever operated by the driver. The following ranges are set in the shift lever: Parking (designated by "P" in FIG. 3), Reverse (R), Neutral (N), Drive (D), Sport (S) and Low (L). The shift positions are arranged in this order. In the Sport range, the transmission ratio of the continuously variable transmission 40 is set higher in order to use the engine in a higher rotating condition. The shift lever is also provided with a shift position sensor 20 for detecting the shift position thereof, so that the ECU 3 controls the operation of the aforementioned forward clutch 33, reverse brake 34, pulley width varying mechanism 46 and starting clutch 50 in response to a detection signal from the sensor 20.

Figure 4:
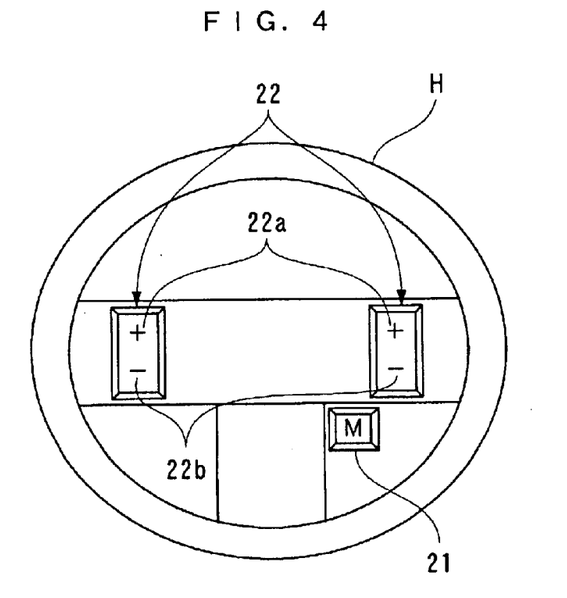
FIG. 4 is a diagram illustrating an MT switch and a transmission stage changing switch.

As illustrated in FIG. 4, a steering wheel H is provided with an MT switch (switch operating means) and transmission stage changing switches 22 (transmission stage changing means). The transmission stage changing switches 22 are disposed on the left and right sides of the steering wheel H, respectively, while the MT switch 21 is disposed below the right-hand switch 22. The MT switch 21 is pushed by the driver for enabling and disabling execution of the MT mode as the transmission mode of the continuously variable transmission 40. The MT switch 21 outputs an operation signal to the ECU 3 which sets the transmission mode of the continuously variable transmission 40 in response to the operation signal.

Each of the transmission stage changing switches 22 is pushed by the driver for changing the continuously variable transmission 40 from one stage to another in the MT mode, and has an up switch 22a and a down switch 22b. The transmission stage changing switches 22 are connected to the ECU 3, so that the ECU 3 shifts up the transmission 40 by one stage from the current transmission stage each time the up switch 22a is pushed in the MT mode, and shifts down the transmission 40 by one stage each time the down switch 22b is pushed.

Figure 5:
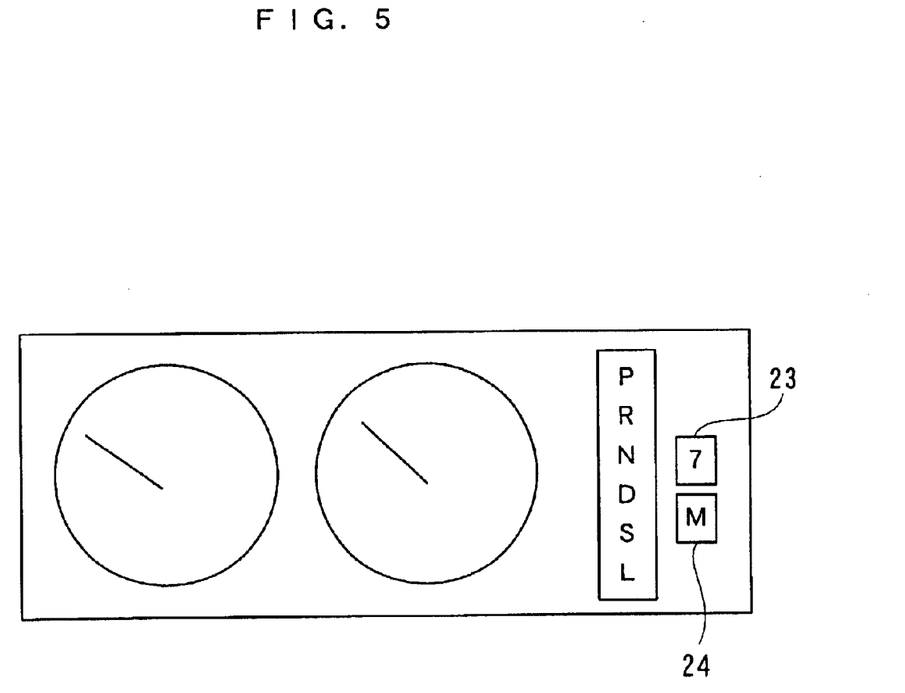
FIG. 5 is a diagram illustrating a transmission stage indicator and an MT indicator.

As illustrated in FIG. 5, a transmission stage indicator 23 and an MT indicator 24 are provided on a dash board panel at the driver's seat together with a tachometer and the like. These indicators 23, 24 are connected to the ECU 3, and under the control of the ECU 3, the indicator 23 indicates a transmission stage in the AT mode or MT mode, and the indicator 24 displays whether or not the transmission 40 is in the MT mode.

The ECU 3 also receives a CRK signal from a crank angle sensor 11. The CRK signal is a pulse signal which is outputted every predetermined crank angle as the crank shaft 2a of the engine 2 rotates. The ECU 3 calculates an engine rotational speed NE based on the CRK signal. The ECU 3 further receives a detection signal indicative of a vehicle speed VP of the vehicle V from a vehicle speed sensor 12 (operating condition detecting means), and a detection signal indicative of an opening AP of an accelerator pedal (not shown) trodden down by the driver from an accelerator opening sensor 13 (operating condition detecting means).

The ECU 3 implements continuously variable transmission mode executing means, stepped automatic transmission mode executing means, stepped manual transmission mode executing means, and transmission mode setting means in this embodiment. The ECU 3 is based on a microcomputer comprised of an I/O interface, a CPU, a RAM, a ROM and the like. The detection signals from the sensors 11–13 and shift position sensor 20 are A/D converted by the I/O interface before they are inputted to the CPU. The CPU sets the continuously variable transmission 40 to one of the CVT mode, AT mode and MT mode in response to these detection signals and in accordance with a control program stored in the ROM, and controls the transmission ratio of the continuously variable transmission 40 in accordance with the set transmission mode.

Figure 6:
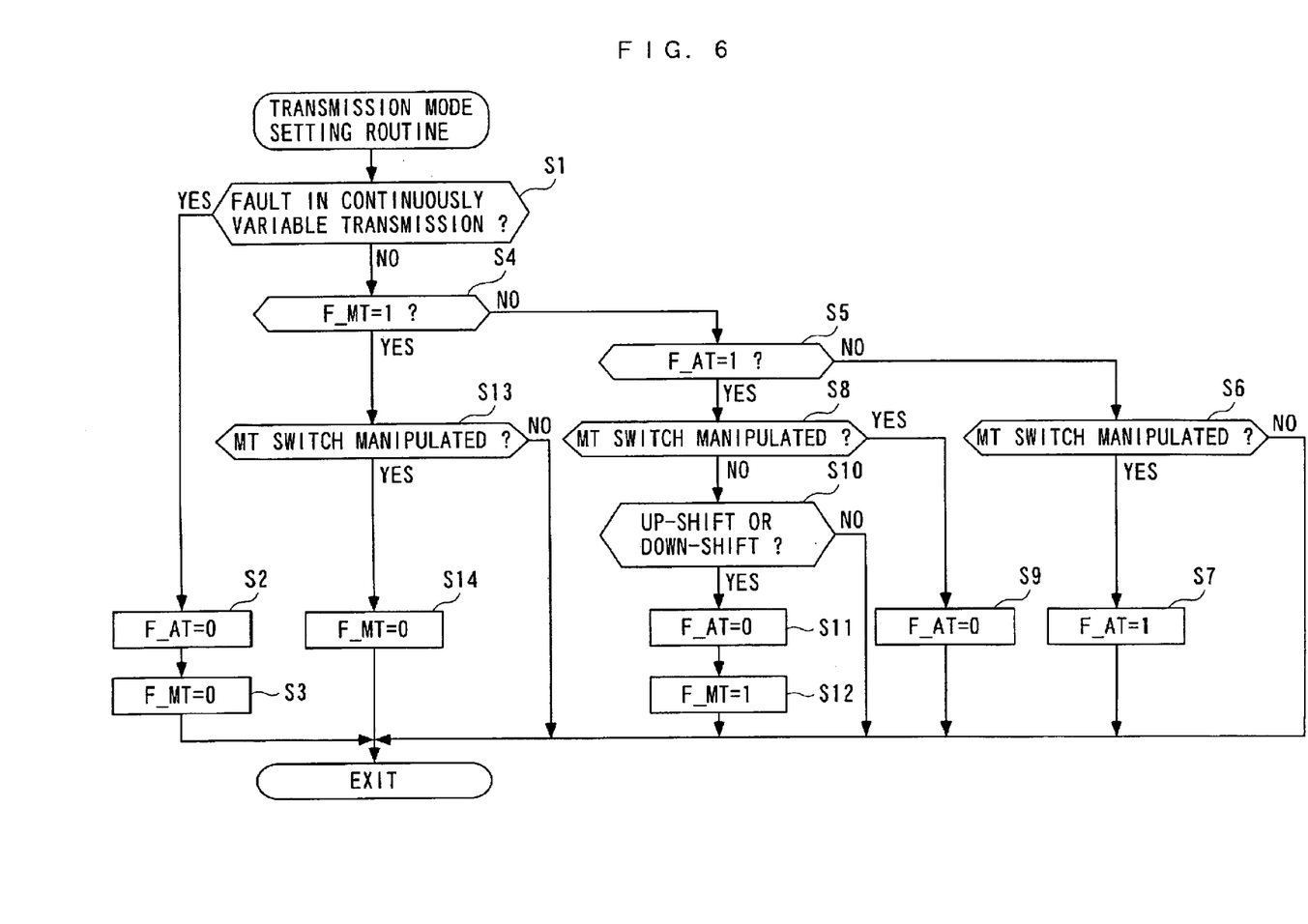
FIG. 6 is a flow chart illustrating a transmission mode setting routine.

FIG. 6 is a flow chart illustrating a transmission mode setting routine for setting the continuously variable transmission 40 to one of the transmission modes. This routine is executed only when the shift lever is set at the drive range or sport range. First, at step 1 (denoted by "S1" in FIG. 6. This denotation is applied to the following steps as well), the CPU determines whether or not a fault has been detected in the continuously variable transmission 40.

If the answer to step 1 is YES, indicating that a fault has been detected in the continuously variable transmission 40, the CPU sets an AT mode execution flag F_AT and an MT mode execution flag F_MT to "0" (at steps 2, 3), followed by termination of the transmission mode setting routine. On the other hand, if the answer to step 1 is NO, the CPU determines whether or not the MT mode execution flag F_MT and AT mode execution flag F_AT are "1" (at steps 4, 5).

If the answers to the steps 4, 5 are both NO, indicating F_MT=0 and F_AT=0, i.e., when the continuously variable transmission 40 is set to the CVT mode, the CPU determines whether or not the MT switch 21 is manipulated (at step 6). If the answer to step 6 is NO, indicating that the MT switch 21 has not been manipulated in the CVT mode, the transmission mode setting routine is terminated without further processing, and the continuously variable transmission 40 is maintained in the CVT mode.

If the answer to step 6 is YES, indicating that the MT switch 21 is manipulated in the CVT mode, the CPU sets the AT mode execution flag F_AT to "1" (at step 7) to set the continuously variable transmission 40 to the AT mode. In this way, when the MT switch 21 is manipulated in the CVT mode, the continuously variable transmission 40 is not immediately switched to the MT mode, but is temporarily set in the AT mode. The answer to step 5 changes to YES with the execution of step 7, in which case the CPU determines whether or not the MT switch 21 is manipulated (at step 8).

If the answer to step 8 is YES, indicating that the MT switch 21 has been manipulated during the AT mode, the CPU sets the AT mode execution flag F_AT to "0" (at step 9) to set the continuously variable transmission 40 to the CVT mode. With such a setting, when the MT switch 21 is erroneously manipulated in the CVT mode, the continuously variable transmission 40 can be immediately returned to the CVT mode by again manipulating the MT switch 21.

If the answer to step 8 is NO, indicating that the MT switch 21 has not been manipulated in the AT mode, the CPU determines whether or not the up switch 22a or down switch 22b is manipulated on the transmission stage changing switch 22 (at step 10). If the answer to step 10 is NO, indicating that none of the switches 22a, 22b has been manipulated, the transmission mode setting routine is terminated without further processing, and the continuously variable transmission 40 is maintained in the AT mode.

If the answer to step 10 is YES, indicating that the up switch 22a or down switch 22b has been manipulated on the transmission stage changing switch 22 in the AT mode, the CPU sets the AT mode execution flag F_AT to "0" on the assumption that the manipulation on the MT switch 21 in the CVT mode is not a mistake but the driver wishes the MT mode (at step 11), and the CPU sets the MT mode execution flag F_MT to "1" (at step 12). In this way, the continuously variable transmission 40 is switched from the AT mode to the MT mode. The answer to step 4 changes to YES with the execution of step 12, in which case the CPU determines whether or not the MT switch 21 is manipulated (at step 13). If the answer to step 13 is NO, the transmission mode setting routine is terminated without further processing, and the continuously variable transmission 40 is maintained in the MT mode.

If the answer to step 13 is YES, indicating that the MT switch 21 has been manipulated in the MT mode, the CPU sets the MT mode execution flag F_MT to "0" (at step 14) to switch the continuously variable transmission 40 from the MT mode to CVT mode, followed by termination of the transmission mode setting routine.

Figure 7:
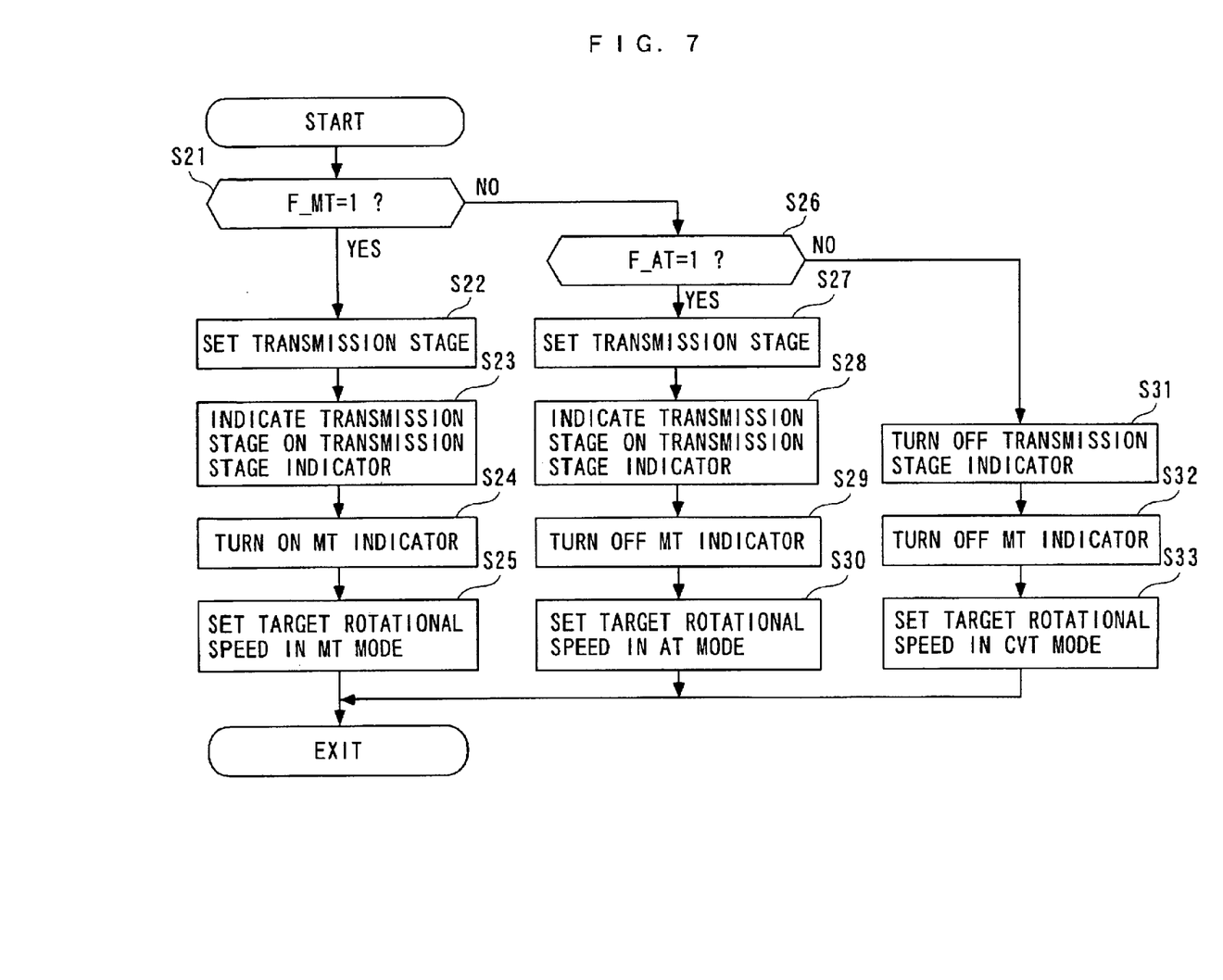
FIG. 7 is a flow chart illustrating a target rotational speed setting routine.

FIG. 7 is a flow chart illustrating a target rotational speed (NOBJ) setting routine. This routine is provided for setting a transmission ratio or a transmission stage in accordance with the transmission mode set in the foregoing manner and a particular operating condition of the vehicle V, and for setting a target rotational speed NOBJ.

First, at step 21, the CPU determines whether or not the MT mode execution flag F_MT is "1." If the answer to step 21 is YES, indicating that the continuously variable transmission 40 is set in the MT mode, the CPU sets a transmission stage in accordance with of a manipulating state of the transmission stage changing switch 22 (at step 22). Specifically, when the continuously variable transmission 40 is switched from the AT mode to the MT mode, the transmission stage is shifted up or down by one stage from the transmission stage in the AT mode immediately before the switching. Subsequently, the transmission stage is shifted up or down by one stage each time the transmission stage changing switch 22 is manipulated.

Next, the CPU turns on the transmission stage indicator 23 to indicate the transmission stage which is set in the foregoing manner (at step 23), and turns on the MT indicator 24 to display that the continuously variable transmission 40 is in the MT mode (at step 24).

Figure 8:
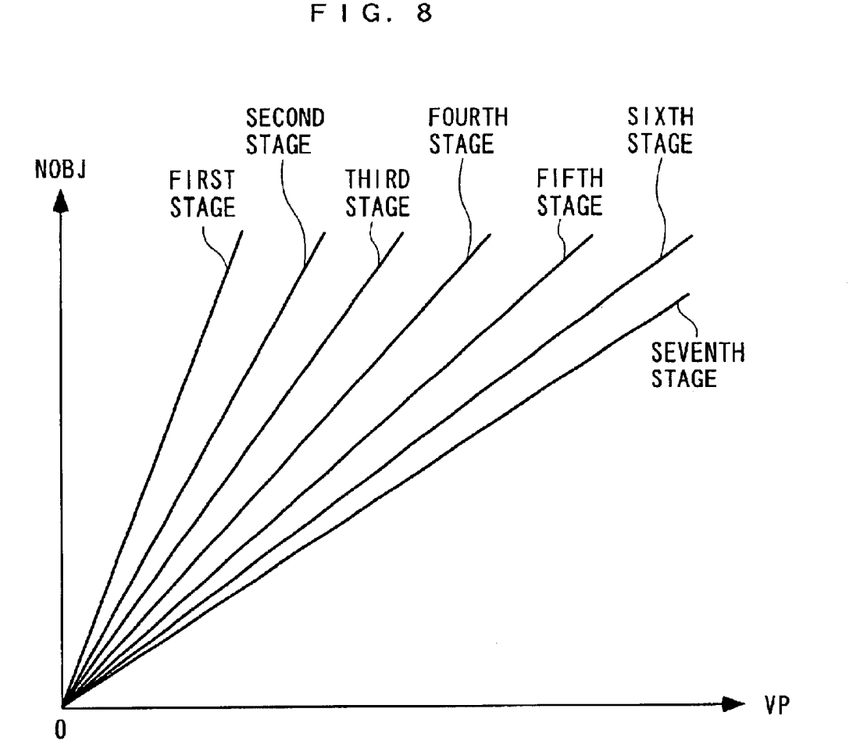
FIG. 8 is a diagram showing an exemplary NOBJ table used in the routine of FIG. 7.

Next, the CPU sets the target rotational speed NOBJ in the MT mode (at step 25), followed by termination of the target rotational speed setting routine. The target rotational speed NOBJ is set based on an NOBJ table shown in FIG. 8, which is set for each of seven transmission stages, in accordance with a particular transmission stage and vehicle speed VP. The NOBJ table represents a transmission ratio which should be provided by each transmission stage in a relationship between the vehicle speed VP and target rotational speed NOBJ, and therefore the table has a smaller slope corresponding to the transmission ratio at a higher transmission stage. As a result, the continuously variable transmission 40 is set to a transmission ratio which should be provided by the set transmission stage by controlling the continuously variable transmission 40 such that the engine rotational speed Ne equals the target rotational speed NOBJ. In this way, the transmission ratio of the continuously variable transmission 40 is controlled step by step in accordance with a transmission stage selected by the driver in the MT mode.

If the answer to step 21 is NO, indicating that the continuously variable transmission 40 is not set in the MT mode, the CPU determines whether or not the AT mode execution flag F_AT is "1" (at step 26). If the answer to step 26 is YES, indicating that the continuously variable transmission 40 is set in the MT mode, the CPU sets the continuously variable transmission 40 to a transmission stage in accordance with the vehicle speed VP and accelerator opening AP based on a transmission stage table shown in FIG. 9 (at step 27).

Figure 9:
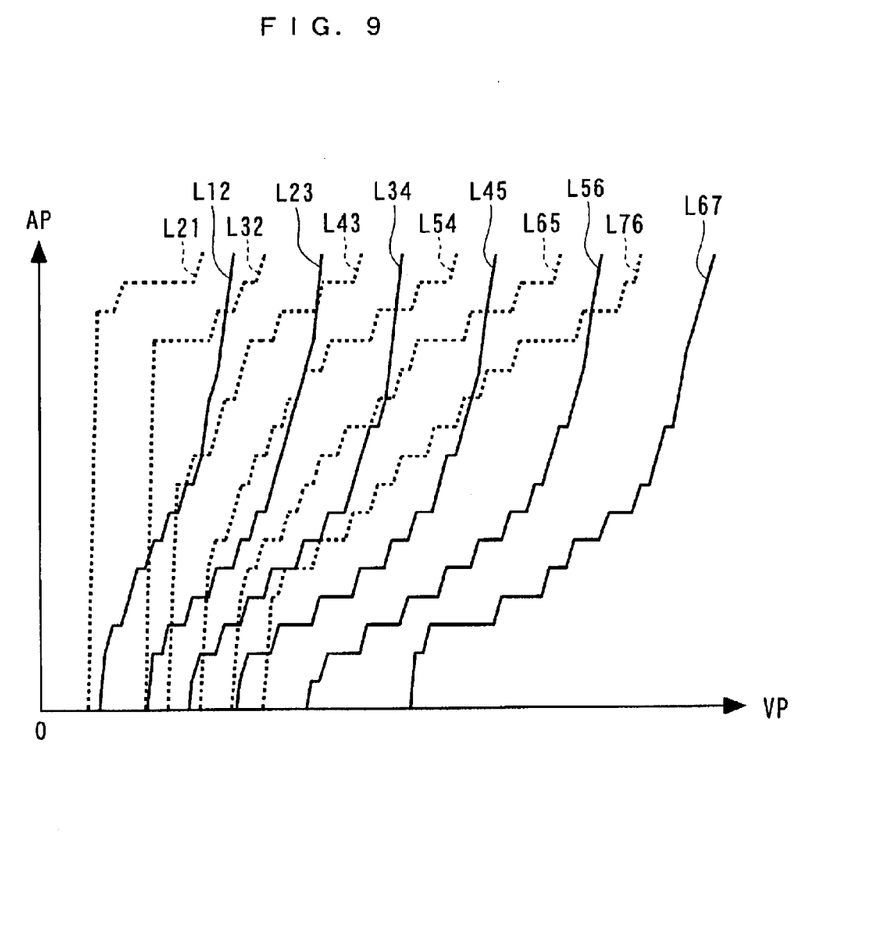
FIG. 9 is a diagram showing an exemplary transmission stage table used in the routine of FIG. 7.

The transmission stage table is set separately for up shifting (solid lines) and for down shifting (dotted lines). Regions of the first to seventh transmission stages are divided by boundaries L12–L67 and L21–L76, and set to have large hysteresis. Specifically, the transmission stage is set and changed in the following manner. Immediately after switching from the CVT mode to the AT mode, the continuously variable transmission 40 is set to a transmission stage corresponding to an up shift region which includes the vehicle speed VP and accelerator opening AP at that time. With the continuously variable transmission 40 set, for example, at the first stage, when the vehicle speed VP rises beyond the up-shift boundary L12 between the first and second stages with the accelerator opening AP being fixed, the continuously variable transmission 40 is switched from the first stage to the second stage. Also, with the continuously variable transmission 40 set at the second stage, when the vehicle speed VP falls below the down-shift boundary L21, the continuously variable transmission 40 is switched from the second stage to the first stage.

At step 28 subsequent to step 27, the CPU turns on the transmission stage indicator 23 to indicate the set transmission stage, and turns off the MT indicator 24 for displaying that the continuously variable transmission 40 is not in the MT mode (at step 29).

Next, the CPU sets the target rotational speed NOBJ in the AT mode (step 30). The target rotational speed NOBJ is set by searching the NOBJ table shown in FIG. 8 in accordance with the transmission stage set at step 27, in a manner similar to the setting of the target rotational speed NOBJ in the MT mode. In the foregoing manner, in the AT mode, a transmission stage is set in accordance with the vehicle speed VP and accelerator opening AP, and the transmission ratio of the continuously variable transmission 40 is set step by step in accordance with the set transmission stage.

Figure 10:
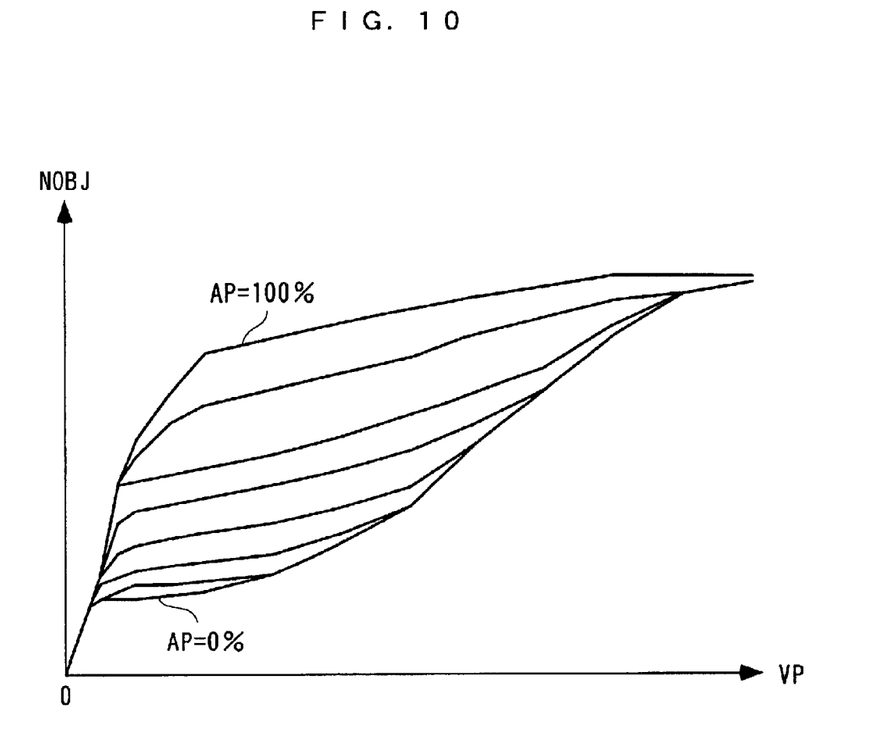
FIG. 10 is a diagram showing an exemplary NOBJ table for a CVT mode used in the routine of FIG. 7.

On the other hand, if the answer to step 26 is NO, indicating that the continuously variable transmission 40 is set in the CVT mode, the CPU turns off the transmission stage indicator 23 and MT indicator 24 (at steps 31, 32), and sets the target rotational speed NOBJ in the CVT mode (at step 33), followed by termination of the target rotational speed setting routine. The target rotational speed NOBJ is set in accordance with the vehicle speed VP and accelerator opening AP based on an NOBJ table for the CVT mode shown in FIG. 10. The NOBJ table is comprised of a plurality of tables each set for a predetermined accelerator opening AP within a range of 0% to 100%. When the accelerator opening AP presents an intermediate value between two of values shown in the tables, the target rotational speed NOBJ is calculated through interpolation. In these tables, the target rotational speed NOBJ is set to a larger value as the vehicle speed is higher and the accelerator opening AP is larger. Thus, in the CVT mode, the transmission ratio of the continuously variable transmission 40 is continuously set by continuously setting the target rotational speed NOBJ in accordance with the vehicle speed VP and accelerator opening AP.

As described above, the control apparatus 1 for a continuously variable transmission for use with a vehicle in this embodiment does not immediately switch the continuously variable transmission 40 from the CVT mode to the MT mode but sets the transmission 40 to the AT mode when the MT switch 21 is manipulated in the CVT mode. Subsequently, the continuously variable transmission 40 is maintained in the AT mode as long as the driver does not manipulate the MT switch 21 or the transmission stage changing switch 22. As a result, the continuously variable transmission 40 is not fixed at a constant transmission ratio but is set to an appropriate transmission stage at all times in accordance with the vehicle speed VP and accelerator opening AP, thereby ensuring a proper engine torque when the continuously variable transmission 40 is switched from the CVT mode to the MT mode.

Even when the MT switch 21 is erroneously manipulated, for example, in the CVT mode, the continuously variable transmission 40 is set to the AT mode to change the transmission ratio step by step in accordance with a particular operating condition of the engine, so that the driver can feel the change in the transmission mode. In addition, the driver can recognize that the continuously variable transmission 40 is no longer in the CVT mode from the indication of the transmission stage indicator 23. In the foregoing manner, the driver can be physically and visually reminded that the continuously variable transmission 40 is no longer in the CVT mode, thereby preventing the over-revolution and the like.

In the AT mode and MT mode, the continuously variable transmission 40 is set to the same transmission stage and the same transmission ratio associated with the set transmission stage, and the currently set transmission stage is indicated on the transmission stage indicator 23. Therefore, upon switching the continuously variable transmission 40 from the AT mode to the MT mode by manipulating the transmission stage changing switch 22, the driver can readily know a transmission stage upon switching, and can shift up or down without awkward feeling.

Figure 12:
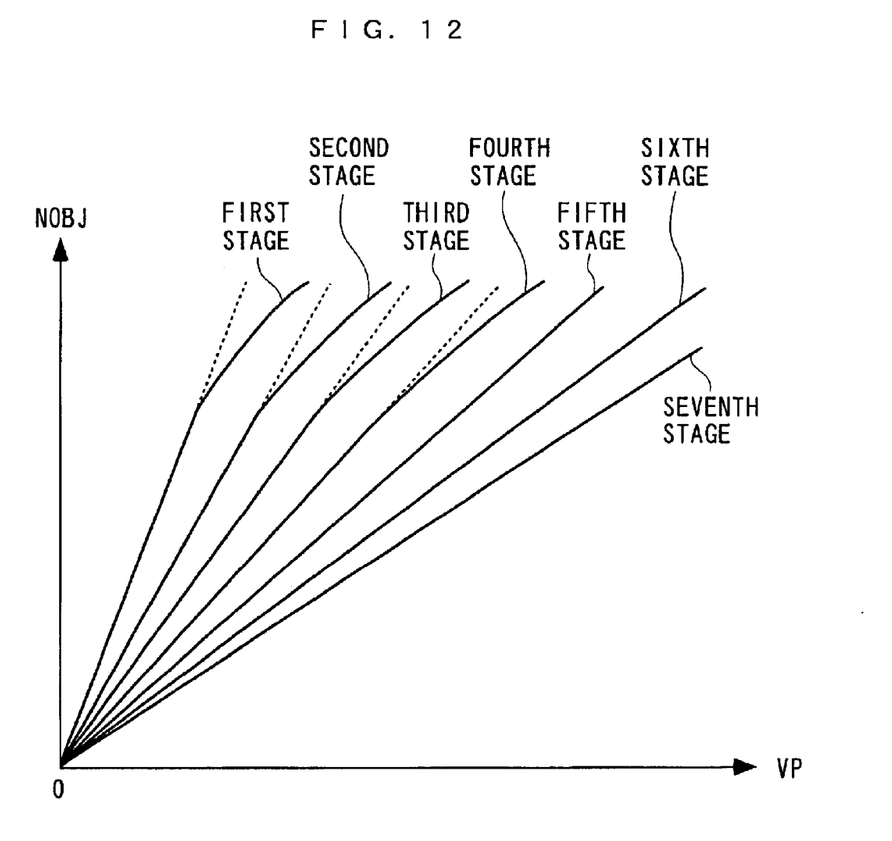
FIG. 12 is a diagram showing another exemplary NOBJ table used in the routine of FIG. 7.

It should be appreciated that the present invention is not limited to the particular embodiment described above, but may be practiced in a variety of manners. For example, while in the foregoing embodiment, the transmission ratio for each transmission stage is set to a constant value in the AT mode and MT mode, the transmission ratio may be changed. FIG. 12 shows an exemplary NOBJ table. In this table, the transmission ratios for the fifth to seventh stages are set to constant values, as is the case with the NOBJ table in FIG. 8, whereas the transmission ratios for the first to fourth stages are set to respective constant values when the vehicle speed VP is not higher than a predetermined value, and are set to smaller values than the constant values within predetermined ranges as the vehicle speed VP is higher beyond the predetermined value. By thus setting the transmission ratio for each transmission stage, it is possible to more appropriately set the transmission ratio for the associated transmission stage while maintaining the stepped transmission in the AT mode and MT mode.

Figure 11:
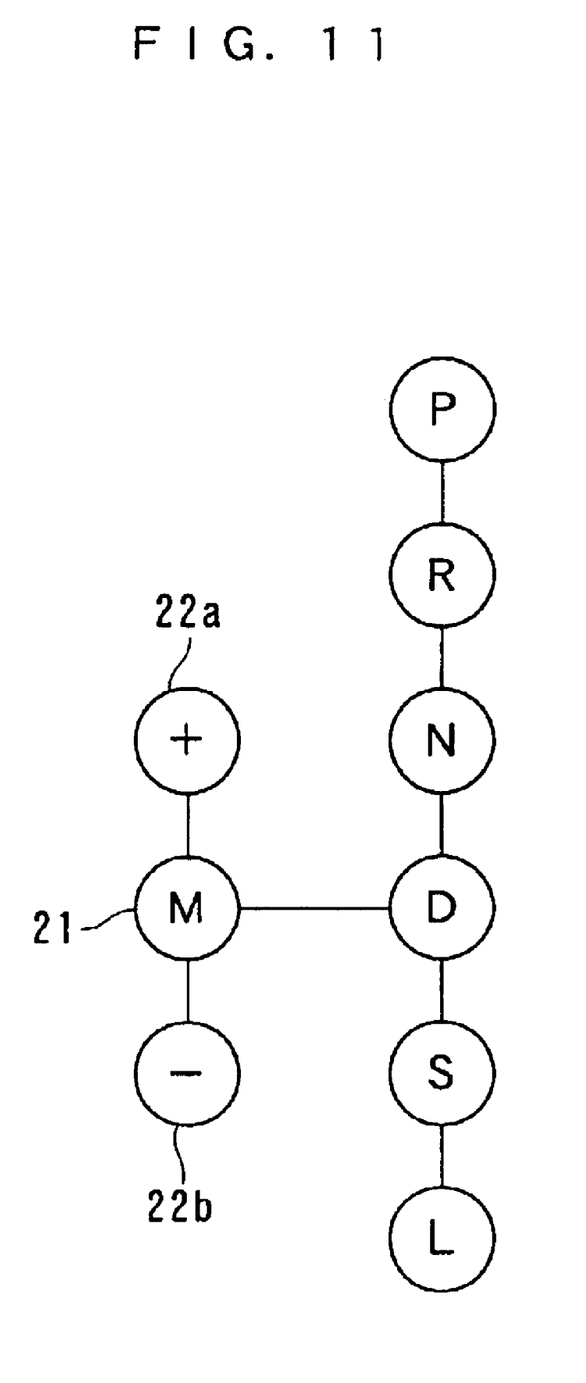
FIG. 11 is a diagram illustrating a shift range and shift positions of a shift lever when the MT switch and transmission stage changing switch are disposed near the shift lever.

While the MT switch 21 and transmission stage changing switch 22 are disposed on the steering wheel H, these switches may be disposed near the shift lever, as illustrated in FIG. 11. In the illustrated example, the MT switch 21 is disposed beside the drive range position, and the up switch 22a and down switch 22b are disposed on upper and lower sides of the MT switch 21 in the shifting direction, respectively. The shift lever is moved to each switch position to perform a switching operation associated with the switch.

Further, in the foregoing embodiment, the driver is allowed to select either the CVT mode or the MT mode, and the continuously variable transmission is set to the AT mode upon switching from the CVT mode to the MT mode. Alternatively, the driver may be allowed to freely select one from these three transmission modes. Moreover, while in the foregoing embodiment, the vehicle speed VP and accelerator opening AP are used as parameters indicative of the operating condition of the vehicle V for setting the transmission ratio in the CVT mode and AT mode, other appropriate parameters may be used instead, as a matter of course. Otherwise, the present invention can be modified in details of the configuration as appropriate without departing from the scope and spirit of the invention.

As described above, the control apparatus for a continuously variable transmission according to the present invention can advantageously allow the driver to select the transmission, mode of the continuously variable transmission from three modes, and provide an appropriate transmission ratio in accordance with an operating condition of the vehicle particularly upon switching from a continuously automatic transmission mode to a stepped manual transmission mode without causing an insufficient engine torque or over-revolution.

What is claimed is:

1. A control apparatus for a continuously variable transmission for use with a vehicle, capable of continuously varying the output of an internal combustion engine, said control apparatus comprising:

operating condition detecting means for detecting an operating condition of said vehicle;

continuous automatic transmission mode executing means for executing a continuous automatic transmission mode for continuously setting a transmission ratio of said continuously variable transmission in accordance with the detected operating condition of said vehicle as a transmission mode for said continuously variable transmission;

stepped automatic transmission mode executing means for executing a stepped automatic transmission mode for setting the transmission ratio of said continuously variable transmission to one of a plurality of predetermined transmission stages in accordance with the detected operating condition of said vehicle as the transmission mode for said continuously variable transmission;

stepped manual transmission mode executing means for executing a stepped manual transmission mode for setting the transmission ratio to one of a plurality of predetermined transmission stages in accordance with a driver's intention of transmission as the transmission mode for said continuously variable transmission;

switch operating means manipulated for switching the transmission mode of said continuously variable transmission; and transmission mode setting means for setting said continuously variable transmission to one of said continuous automatic transmission mode, said stepped automatic transmission mode and said stepped manual transmission mode in accordance with a manipulating state of said switch operating means.

2. A control apparatus for a continuously variable transmission for use with a vehicle according to claim 1, wherein said transmission mode setting means temporarily sets said continuously variable transmission to said stepped automatic transmission mode when said switch operating means is manipulated to switch from said continuous automatic transmission mode to said stepped manual transmission mode.

3. A control apparatus for a continuously variable transmission for use with a vehicle according to claim 2, further comprising transmission stage changing means manipulated for changing said continuously variable transmission from one transmission stage to another, wherein said transmission mode setting means sets said continuously variable transmission to said stepped manual transmission mode when said transmission stage changing means is manipulated after said continuously variable transmission has been temporarily set in said stepped automatic transmission mode.

* * * * *